Patented Jan. 6, 1931

1,787,625

UNITED STATES PATENT OFFICE

ADDIE HUTCHINSON, OF PORTSMOUTH, OHIO

HIGH-TEMPERATURE CEMENT

No Drawing. Application filed April 8, 1930. Serial No. 442,690.

This invention relates to high temperature cement of the character adaptable to temperatures encountered in coke ovens.

An object of the invention is to provide a cement for pointing up the jambs and cracks in coke ovens, which is extremely fast in setting, only requiring about an hour's time, and that will harden under the means to form a permanent patch that will not crack, chip or peel under the conditions of coke oven operation.

Further objects of the invention are to provide a composition of the character referred, that is very simple in its mixing operation, that is thoroughly reliable for its intended purpose, requiring the minimum of technical skill and apparatus, and that is comparatively inexpensive to manufacture and use.

With the foregoing and other objects in view, the invention consists of a combination and arrangement of ingredients, as will be hereinafter more specifically illustrated and described in the accompanying specification, wherein is disclosed an embodiment of the invention, but it is to be understood that changes, variations and modifications may be resorted to without departing from the spirit of the claim hereto appended.

The invention in its broadest aspect, consists of a mixture of what is termed herein silica sand, ground silica brick, Portland cement, and soda ash rendered plastic by an application of water either in a mixing receptacle or atomized in the presence of water vapors.

After considerable experiment it has been found that the following proportions, give the best results:

| | Parts by weight |
|---|---|
| Silica sand | 15 |
| Ground silica brick | 3 |
| Portland cement | 2 |
| Soda ash | 1½ |

The silica sand above-mentioned runs to the following analysis:

| | Per cent |
|---|---|
| $SiO_2$ | 95.10 |
| $Al_2O_3 + Fe_2O_3$ | 1.25 |
| $CaO$ | 1.50 |
| $MgO$ | Trace |

The ground silica brick runs to the following analysis:

| | Per cent |
|---|---|
| $SiO_2$ | 98.20 |
| $Al_2O_3 + Fe_2O_3$ | .85 |
| $CaO$ | .13 |
| $MgO$ | Trace |

In practicing the invention the silica sand is finely pulverized and mixed in the dry state with the finely ground silica brick whereupon the pulverized soda ash and Portland cement in the dry pulverized state are thoroughly incorporated.

The mixing operation may be carried out in any suitable mixing receptacle until a homogeneous mechanical mixture of the four ingredients results.

In applying this mixture, in a flow gun, the dry mixture is emitted from the nozzle in direct contact with a nozzle on the gun which emits water under pressure in the atomized or vaporous state. The dry powdered mixture of the cement is thus thoroughly atomized with the water vapors when it comes in contact with the jamb or crack of the furnace to be patched.

Thus, when the vaporized plastic mixture strikes the surface to be patched, there is a plastic deposition on the parts of the oven, which will set up in about an hour's time.

On the other hand, if it is desired to apply the cement by a trowel, then a mixture of the dry cement is mixed with sufficient water to render it plastic. Thereafter, the plastic cement may be smeared on the part of the coke oven to be patched by the trowel.

The Portland cement in the mixture causes the silica sand and ground silica brick to conformably set up or harden over the part of the oven to be patched until heat is applied to the oven, thereby preventing the cement from peeling off during the charging of the oven.

When heat is applied to the oven, the soda ash has a tendency to become plastic and in time will harden under the temperatures to which coke ovens are subjected, whereby the hardening of the soda ash will thoroughly bind the cement, silica sand and ground silica brick into a hard mass which will not chip, crack or peel.

It has been found that when the coke ovens are subjected to heat that the soda ash becomes viscous and thoroughly penetrates the mineral ingredients before they harden thereby insuring a thorough bound patch.

Without the soda ash, the mineral ingredients, upon the application of heat, would peel, crack and finally fall out of the jambs or other crevices in which the patch is applied.

It therefore follows that the soda ash begins to function when the heat is applied, while the Portland cement forms the binder prior to the application of the heat.

It is to be understood that by describing in detail herein any particular form, arrangement or sequence of operation, it is not intended to limit the invention beyond the terms of the claim, or the requirements of the prior art.

Having thus described my invention, what I claim as new is:—

A high temperature cement comprising 15 parts silica sand, 3 parts ground silica brick, 2 parts Portland cement, and 1½ parts of soda ash.

In testimony whereof I affix my signature.

ADDIE HUTCHINSON.